US012692120B2

(12) United States Patent
Forster

(10) Patent No.: US 12,692,120 B2
(45) Date of Patent: Jul. 28, 2026

(54) CORD REEL HOLDER

(71) Applicant: Kenneth Forster, Phoenix, AZ (US)

(72) Inventor: Kenneth Forster, Phoenix, AZ (US)

( * ) Notice: Subject to any disclaimer, the term of this patent is extended or adjusted under 35 U.S.C. 154(b) by 101 days.

(21) Appl. No.: 18/474,831

(22) Filed: Sep. 26, 2023

(65) Prior Publication Data

US 2024/0101389 A1     Mar. 28, 2024

Related U.S. Application Data

(60) Provisional application No. 63/409,973, filed on Sep. 26, 2022.

(51) Int. Cl.
| | |
|---|---|
| *B65H 75/44* | (2006.01) |
| *B60R 9/06* | (2006.01) |
| *B60R 13/10* | (2006.01) |
| *B65H 75/40* | (2006.01) |

(52) U.S. Cl.
CPC ............. *B65H 75/446* (2013.01); *B60R 9/06* (2013.01); *B60R 13/105* (2013.01); *B65H 75/40* (2013.01); *B65H 75/4426* (2013.01); *B65H 75/4471* (2013.01)

(58) Field of Classification Search
CPC ................................ B65H 75/446; B60R 9/06
USPC ........................................................ 224/488
See application file for complete search history.

(56) References Cited

U.S. PATENT DOCUMENTS

| | | | | |
|---|---|---|---|---|
| 3,853,285 | A | * | 12/1974 | Woodring .............. B65H 75/38 242/378.1 |
| 4,467,979 | A | * | 8/1984 | Koehler ............. B65H 75/4471 242/402 |
| 5,056,698 | A | * | 10/1991 | Kozakevich .......... B60R 13/105 242/398 |
| 5,094,396 | A | | 3/1992 | Burke |
| 5,255,767 | A | * | 10/1993 | Norwood ............... H02G 11/02 224/400 |
| 5,267,705 | A | * | 12/1993 | Hofrichter ............. B65H 49/24 242/129 |
| 5,445,252 | A | * | 8/1995 | McKee ................ B65H 75/425 191/12 C |
| 5,669,471 | A | * | 9/1997 | Unze ...................... H01R 13/72 439/501 |
| 5,803,216 | A | * | 9/1998 | McNaught ............. H01R 13/66 191/12.4 |
| 5,855,262 | A | * | 1/1999 | Jackson ............... B65H 75/425 242/378.1 |

(Continued)

*Primary Examiner* — Nathan J Newhouse
*Assistant Examiner* — Lester L Vanterpool
(74) *Attorney, Agent, or Firm* — Secant IP, P.L.L.C.

(57)     ABSTRACT

A cord reel holder that mounts to a licensin for a cord reel that houses a cord reel with a fixed length cord and a retractable length cord. The retractable length cord is carried by the cord reel such that a length of the retractable length cord that extends from the housing is adjustable by rotating a reel within the housing. The cord reel holder has a housing with a front wall, a rear wall, and connecting sidewalls that maintain the front wall in a fixed position relative to the rear wall. The cord reel housing defines a receptacle that is sized to receive the cord reel. Each of the front wall and the rear wall has a series of apertures that correspond with mounting apertures for mounting a license plate to a vehicle, and the connecting sidewall has connection points for securing the cord reel within the receptacle.

12 Claims, 5 Drawing Sheets

(56)                    References Cited

U.S. PATENT DOCUMENTS

| | | | | |
|---|---|---|---|---|
| 6,264,016 | B1 * | 7/2001 | Bales | H02G 11/02 |
| | | | | 191/12.4 |
| 6,286,238 | B1 * | 9/2001 | Harrington | B60R 13/105 |
| | | | | 40/201 |
| 6,439,360 | B1 * | 8/2002 | Miller | H02G 11/02 |
| | | | | 191/12.4 |
| 6,854,575 | B1 * | 2/2005 | Desormeaux | H02G 11/02 |
| | | | | 191/12.4 |
| 6,981,670 | B2 | 1/2006 | Harrington | |
| 9,136,684 | B2 * | 9/2015 | Giles | B65H 75/425 |
| D802,506 | S * | 11/2017 | Bargen | D12/193 |
| 2003/0038203 | A1 * | 2/2003 | Ohama | H02G 11/02 |
| | | | | 174/69 |
| 2019/0298984 | A1 | 10/2019 | Ethridge | |
| 2021/0033218 | A1 * | 2/2021 | Ben | F16B 5/0036 |

* cited by examiner

CORD REEL HOLDER

TECHNICAL FIELD

This relates to a cord reel holder, and in particular, a cord reel holder for mounting to a license plate mount on a vehicle.

BACKGROUND

When connecting a vehicle to a power source, such as to power the block heater of a vehicle, or to charge a batter carried by the vehicle, an extension cord is typically used. Users may prefer to have the power cord carried by the vehicle for convenience. An example of a retractable cord mounted to the front of a vehicle is described in U.S. Pat. No. 9,136,684 (Giles) entitled "Vehicle block heater cord winder".

SUMMARY

According to an aspect, there is provided a cord reel holder for a cord reel. The cord reel comprises a housing that houses a cord reel, a fixed length cord that extends from a first port at or toward a bottom of the housing and a retractable length cord that extends from a second port at or toward a top of the housing, the retractable length cord being carried by the cord reel such that a length of the retractable length cord that extends from the housing is adjustable by rotating the reel. The cord reel holder comprises: a housing comprising a front wall, a rear wall, and connecting side-walls that maintain the front wall in a fixed position relative to the rear wall, the cord reel housing defining a receptacle that is sized to receive the cord reel, wherein each of the front wall and the rear wall comprise a series of apertures that correspond with mounting apertures for mounting a license plate to a vehicle, and the connecting sidewall comprises connection points for securing the cord reel within the receptacle. The mounting apertures may be on a front or a rear of a vehicle.

According to other aspects, the cord reel holder may comprise one or more of the following features, alone or in combination: the rear wall may be mounted to a vehicle, a license plate may be mounted to the front wall, and the cord reel may be secured within the receptacle; the cord reel may be secured within the receptacle by pin connectors or straps that engage the cord reel and the housing; a top end of the housing may be open to receive the cord reel; the connecting sidewalls may define access openings corresponding to a position of the fixed length cord and a position the retractable length cord; the connecting sidewalls may comprise a plurality of flanges that extend between the front wall and the rear wall; the plurality of flanges may comprise a first flange on a first side of the holder and a second flange on a second side of the holder, the first flange and the second flange being positioned at a top edge of the housing; the plurality of flanges may further comprise one or more bottom flanges; and the plurality of flanges may define access openings corresponding to a position of the fixed length cord and a position of the retractable length cord.

In other aspects, the features described above may be combined together in any reasonable combination as will be recognized by those skilled in the art.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION OF PREFERRED EMBODIMENTS

Figure 1:
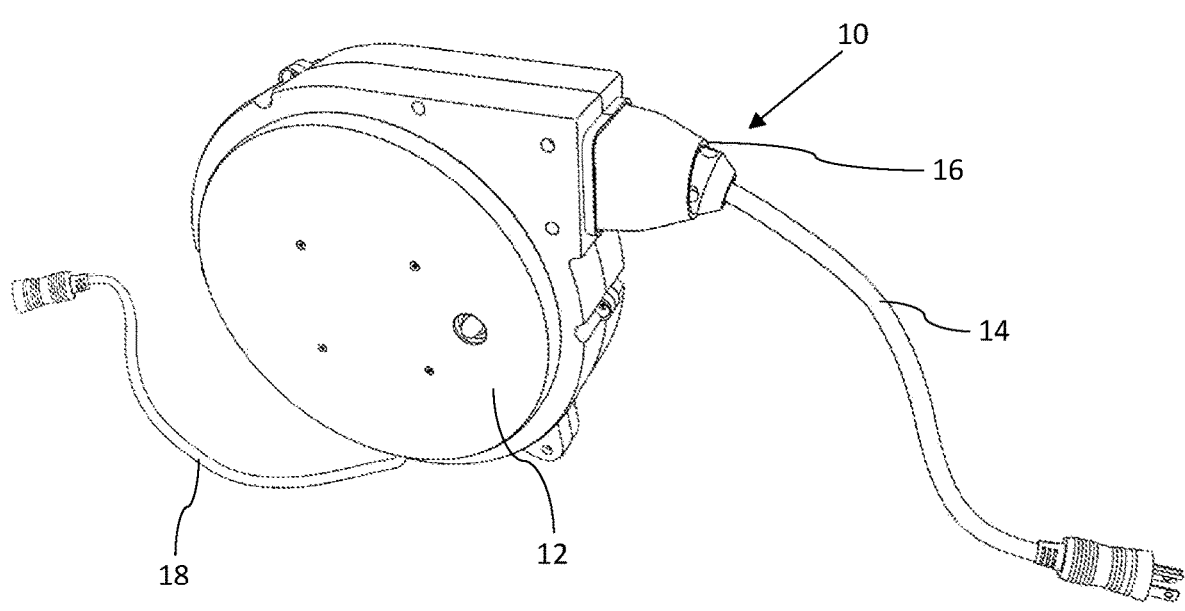
FIG. 1 is a perspective view of a cord reel.
Figure 2:
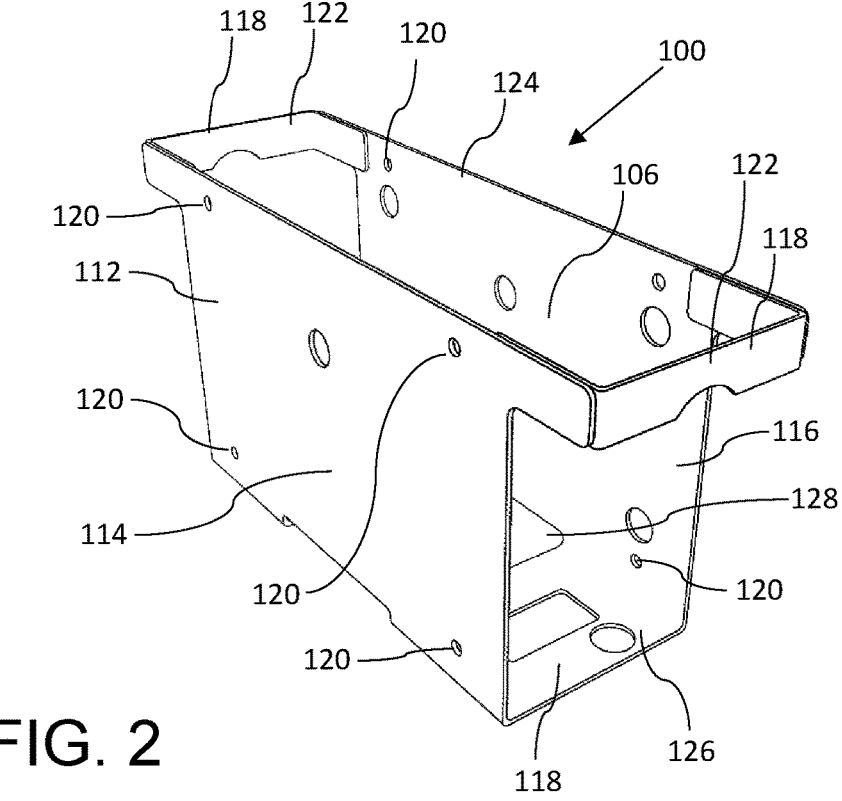
FIG. 2 is a rear perspective view of a cord reel holder.
Figure 3:
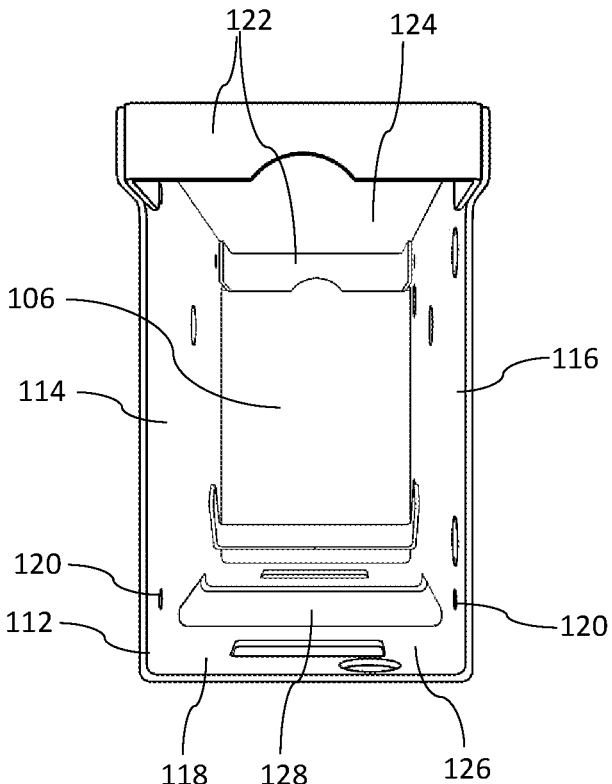
FIG. 3 is an end view of a cord reel holder.
Figure 4:
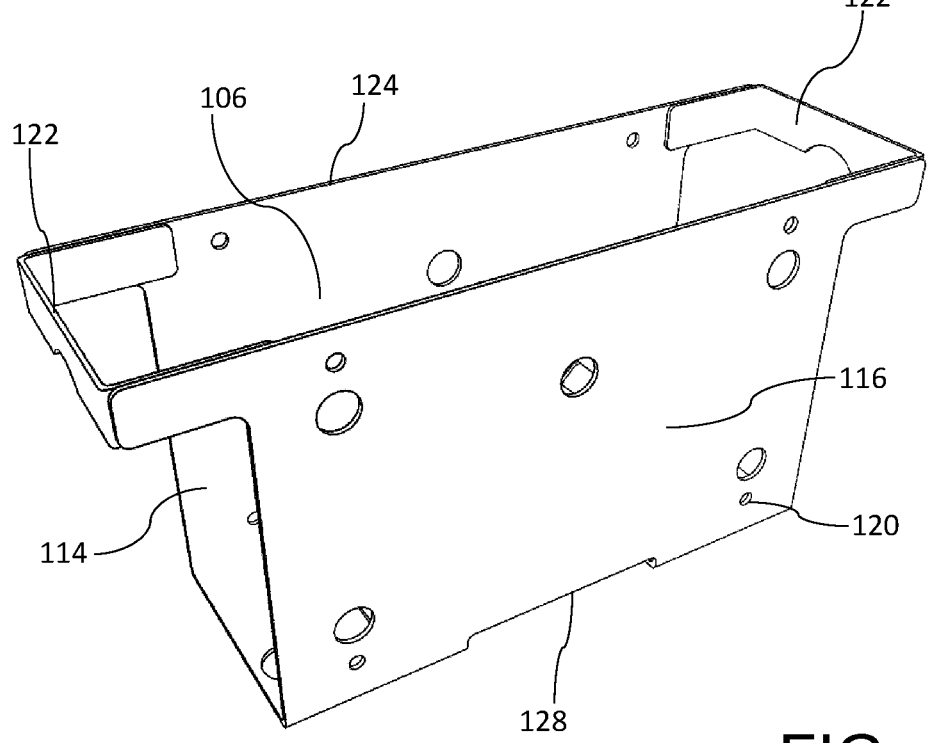
FIG. 4 is a front perspective view of a cord reel holder.
Figure 5:
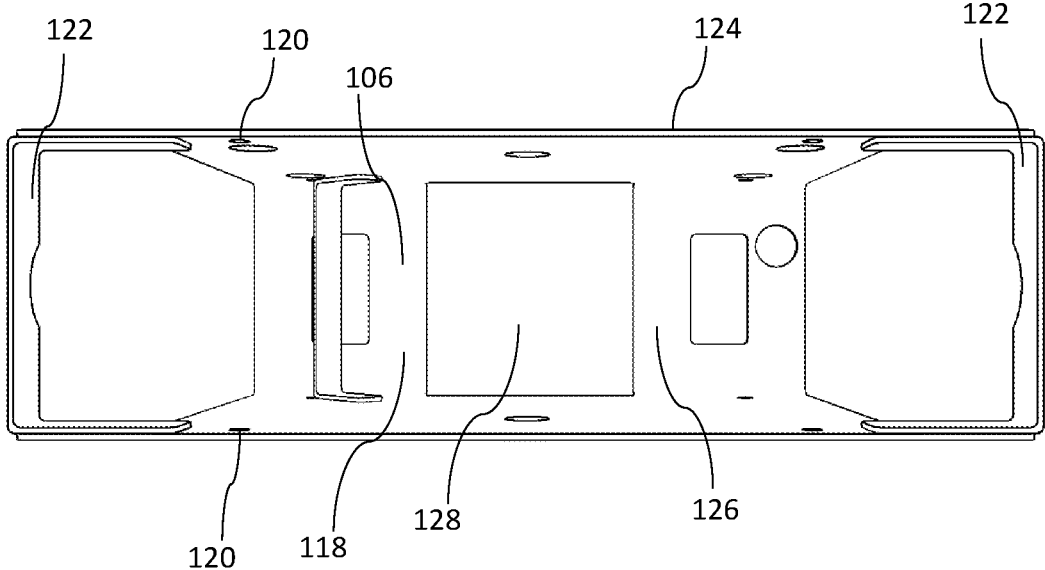
FIG. 5 is a top view of a cord reel holder.

A cord reel holder, generally identified by reference number 100, will now be described with reference to FIG. 2 through 10. Cord reel holder 100 is intended to hold a cord reel 10, an example of which is shown in FIG. 1. Referring to FIG. 1, cord reel 10 includes a housing 12 that houses an extension cord that is wound on a spool (not shown) carried within housing 12. The extension cord includes a retractable length of cord 14 that extends out a first port 16 and a fixed length of cord 18 that extends out a second port 20 of housing 12. Preferably, housing 12 is weatherproof or weather resistant to reduce the risk of damage due to rain, snow, and road grit.

Figure 9:
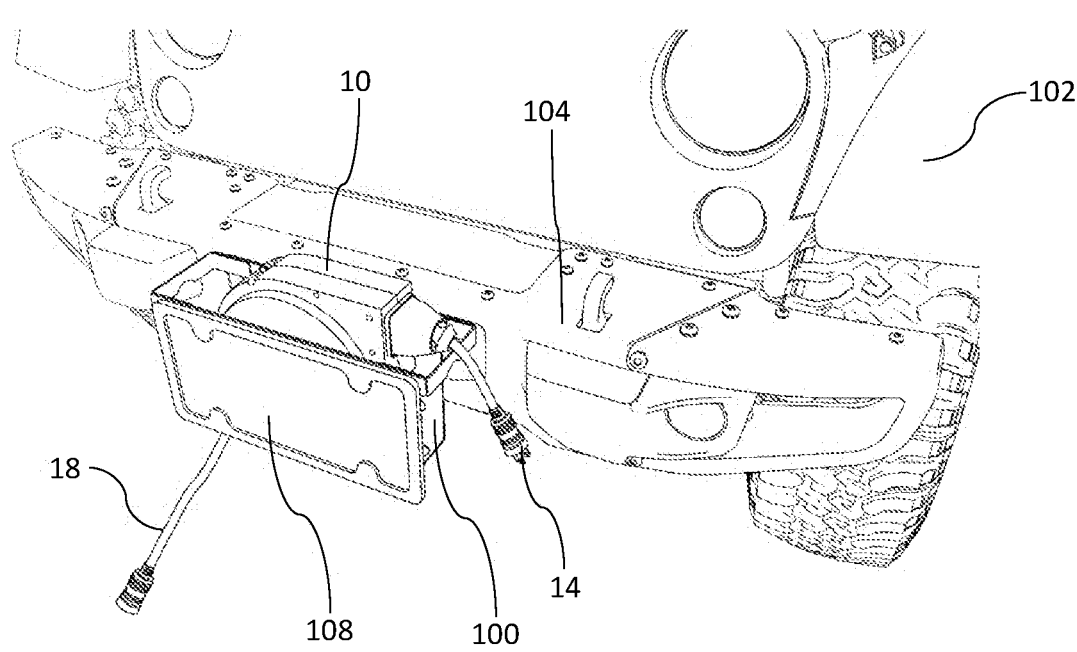
FIG. 9 is a perspective view of a front end of a vehicle with the cord reel holder and cord reel installed.
Figure 10:
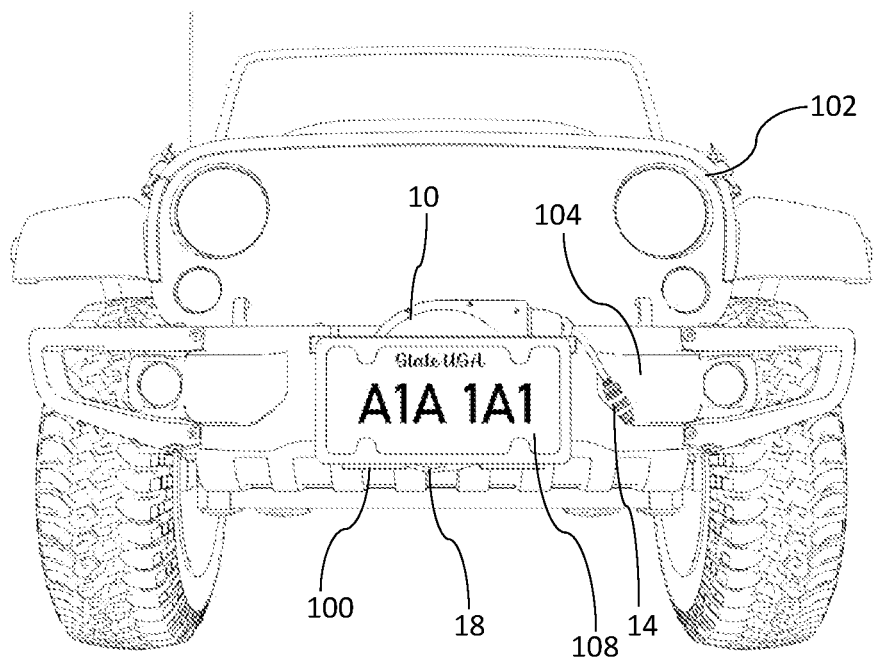
FIG. 10 is a front view of a front end of a vehicle with the cord reel holder and cord reel installed.

Referring to FIG. 9, there is shown a cord reel holder 100 for cord reel 10. Cord reel holder 100 is designed to be fixed to a vehicle 102, typically a bumper 104, and defines a receptacle 106 that receives and secures cord reel 10. Where cord reel holder 100 is attached in the place of a license plate 108, license plate 108 may be attached to an outer surface of cord reel holder 100 as shown.

Referring to FIG. 2-5, cord reel holder 100 includes a housing 112 having a front wall 114, a rear wall 116, and connecting sidewalls 118 that maintain rear wall 114 in a fixed position relative to front wall 116 and defines receptacle 106 that is sized to receive cord reel 10. In this context, the relative terms front and rear in the context of front wall 114 and rear wall 116 refers to their position relative to the surface on which housing 112 will be mounted, where rear wall 116 is adjacent to the mounting surface, and front wall 114 extends out from the mounting surface. As shown, front and rear walls 114 and 116 have a series of apertures 120 in a pattern that correspond with mounting apertures for mounting license plate 108 to vehicle 102. Front wall 114 may include apertures 120 that allow a screwdriver or other installation tool to access the mounting apertures through front wall 114. While this pattern is generally standard between vehicles 102, walls 114 and 116 may include more apertures 120 to account for different aperture patterns. If the pattern is symmetrical (or at least the portion of the aperture pattern being used on a given vehicle 102), either front wall 114 or rear wall 116 may be attached to vehicle 102. The front and rear walls 114 and 116 preferably have the same pattern so that, referring to FIG. 7, cord reel holder 100 allows license plate 108 to be attached to front wall 114 of cord reel holder 100 when rear wall 116 is attached to vehicle 102. In that sense, cord reel holder 100 may be considered to act as a spacer for license plate 108.

As shown, cord reel holder 100 is mounted to a front bumper 104 of vehicle 102. However, cord reel holder 100 may be mounted to any suitable location on vehicle 102 that has a corresponding set of apertures that allow a license plate 108 to be mounted. This may include front bumper 104 as depicted, the rear bumper, or other location on the front end or rear end of a vehicle, depending on the design of the vehicle and where the plate-mounting apertures are provided. Other locations may include the rear lift gate or trunk on the rear end, etc.

Connecting sidewall 118 may be continuous or intermittent. As shown, the connecting sidewall 118 includes top flanges 122 that define a continuous receptacle 124 opening at the top of cord reel holder 100, and bottom flanges 126 that include apertures that allow the cord reel 10 to be secured in place by threaded pin connectors, for example by engaging mounting apertures carried by cord reel 10, such as may be found on a mounting bracket carried by cord reel 10. fixed length of cord 18 from cord reel 10 may then be connected to vehicle 102, such as a charging port of an electric vehicle or the block heater typically found in vehicles found in cold weather climates, while the retractable length of cord 14 may then be extended to connect to an electrical outlet. As shown, connecting sidewall 118, whether made from flanges or otherwise, define openings 128 that permit access to retractable length of cord 14 and fixed length of cord 18.

Figure 6:
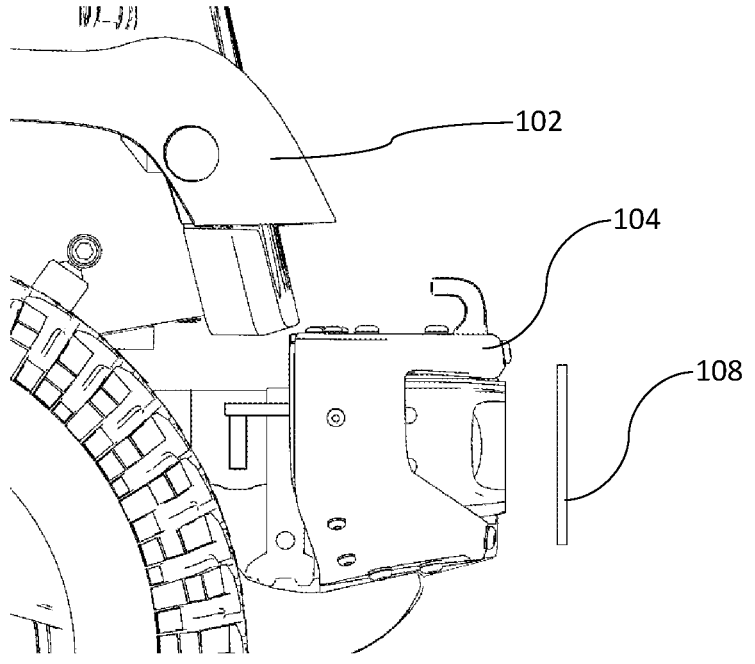
FIG. 6 is an exploded side view of a license plate being removed from a front of a vehicle.
Figure 7:
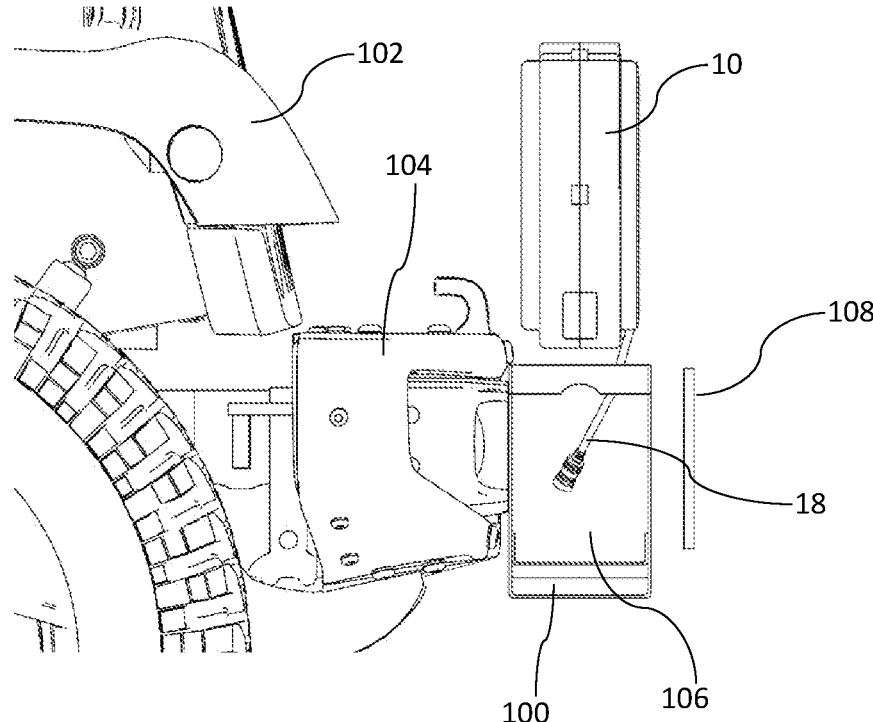
FIG. 7 is an exploded view of a front end of a vehicle with the cord reel holder installed.
Figure 8:
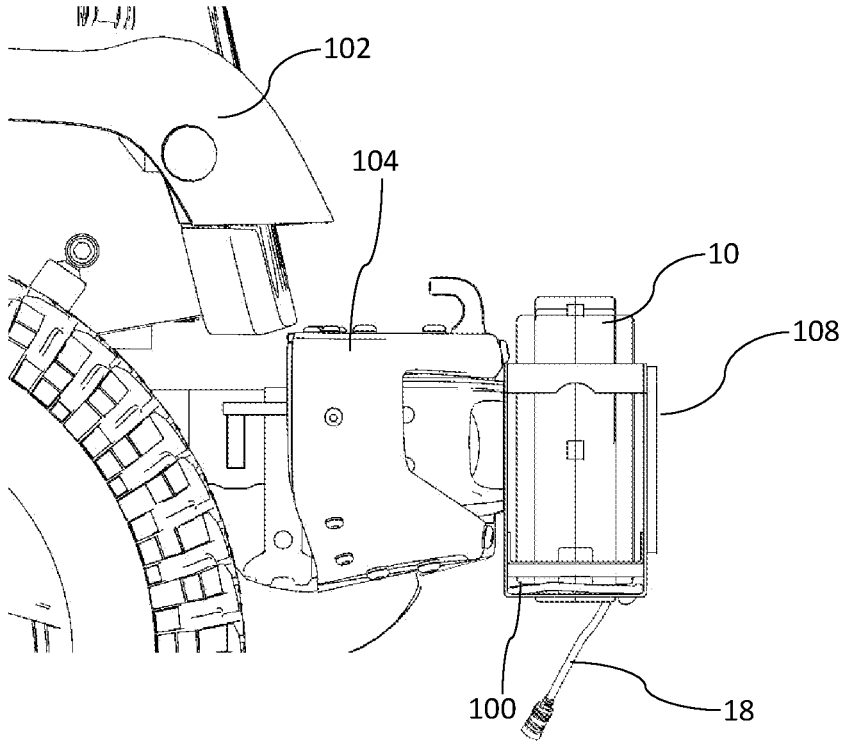
FIG. 8 is a side view of a front end of a vehicle with the cord reel holder and cord reel installed.

A cord reel may be mounted to the front of a vehicle by removing license plate 108, if present, as shown in FIG. 6. Referring to FIG. 7-10, cord reel holder 100 is then mounted to vehicle 102, cord reel 10 is inserted into cord reel holder 100, and license plate 108 may be reattached to cord reel holder 100, if necessary. As shown, retractable length of cord 14 is accessible from a top of cord reel holder 100, while fixed length of cord 18 may be accessible from a bottom end of cord reel holder 100.

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the following claims should not be limited by the preferred embodiments set forth in the examples above and in the drawings but should be given the broadest interpretation consistent with the description as a whole.

What is claimed is:

1. A cord storage device, comprising:
a cord reel, comprising:
  a reel housing;
  a fixed length cord that extends from a first port of the reel housing; and
  a retractable length cord that extends from a second port of the reel housing, the retractable length cord being housed within the reel housing such that a length of the retractable length cord that extends from the reel housing is adjustable, the retractable length cord being in electrical connection with the fixed length cord; and
a cord reel holder, the cord reel holder comprising a receptacle that is defined by sidewalls, the receptacle having an open top and being sized to receive the cord reel, the cord reel holder being configured such that:
  a front wall and a rear wall of the sidewalls each comprise a series of apertures that correspond with mounting apertures for mounting a license plate to a vehicle; and
  the sidewalls comprise connection points for securing the reel housing within the receptacle.

2. The cord storage device of claim 1, wherein a top of the reel housing is above a top edge of the cord reel holder.

3. The cord storage device of claim 1, wherein, with the cord reel holder mounted to a vehicle, the cord reel is removably mounted within the cord reel holder.

4. The cord storage device of claim 1, wherein the cord reel is secured within the receptacle by pin connectors or straps that engage the cord reel and the cord reel holder.

5. The cord storage device of claim 1, wherein the sidewalls comprise connecting sidewalls that connect between the front wall and the rear wall, the connecting sidewalls defining an access opening that corresponds to a position of the fixed length cord such that the fixed length cord is accessible via the access opening.

6. The cord storage device of claim 5, wherein the connecting sidewalls comprise a plurality of flanges that extend between the front wall and the rear wall.

7. The cord storage device of claim 6, wherein the plurality of flanges comprises a first flange on a first side of the holder and a second flange on a second side of the holder, the first flange and the second flange being positioned at a top edge of the housing.

8. The cord reel holder of claim 7, wherein the plurality of flanges further comprises one or more bottom flanges.

9. The cord reel holder of claim 6, wherein the connecting sidewalls are open between adjacent ones of the plurality of flanges.

10. The cord reel holder of claim 1, wherein the front wall comprises tool-receiving openings sized to permit a tool to access the series of apertures of the rear wall, and further comprising a first set of pin connectors that secure the rear wall.

11. The cord reel holder of claim 1, wherein a width of the reel housing is substantially the same as a width of the receptacle measured horizontally, and the horizontal width of the receptacle is greater than a width of an installed license plate measured horizontally.

12. The cord reel holder of claim 1, wherein the reel housing is weather resistant.

\* \* \* \* \*